United States Patent [19]
Fujibayashi et al.

[11] Patent Number: 5,369,150
[45] Date of Patent: Nov. 29, 1994

[54] RESIN COMPOSITION FOR AQUEOUS PAINTS

[75] Inventors: Toshio Fujibayashi, Hadano; Haruo Nagaoka, Hiratsuka, both of Japan

[73] Assignee: Kansai Paint Co., Ltd., Hyogo, Japan

[21] Appl. No.: 48,512

[22] Filed: Apr. 20, 1993

[30] Foreign Application Priority Data

Apr. 24, 1992 [JP] Japan ................................. 4-129740

[51] Int. Cl.$^5$ .......................... C08K 3/20; C08L 63/04
[52] U.S. Cl. ...................................................... 523/414
[58] Field of Search ............................................ 523/414

[56] References Cited

U.S. PATENT DOCUMENTS

| | | | |
|---|---|---|---|
| 3,799,854 | 3/1974 | Jerabek | 204/181 |
| 4,320,220 | 3/1982 | Pampouchidis | 524/591 |
| 4,737,530 | 4/1988 | Hoets et al. | 523/414 |
| 5,034,109 | 7/1991 | Fujibayashi et al. | 204/181.7 |
| 5,089,542 | 2/1992 | Nishida et al. | 525/117 |

FOREIGN PATENT DOCUMENTS

| | | |
|---|---|---|
| 0356970 | 3/1990 | European Pat. Off. |
| 47-759 | 1/1972 | Japan |
| 51-130498 | 11/1976 | Japan |
| 52-6306 | 2/1977 | Japan |

*Primary Examiner*—Melvyn I. Marquis
*Assistant Examiner*—D. Aylward
*Attorney, Agent, or Firm*—Wenderoth, Lind & Ponack

[57] ABSTRACT

A resin composition for an aqueous coating composition contains as a main component a cationic resin (U) having a primary hydroxyl group, obtained by reacting (A) a phenol-novolak epoxy resin, (B) a primary or secondary amine compound having a primary hydroxyl group, and (c) a phenol compound having at lest one phenolic hydroxyl group per molecule. The composition has improved water dispersibility, bath stability and pigment dispersibility, and is useful as a cationic electrodeposition coating composition.

16 Claims, No Drawings

RESIN COMPOSITION FOR AQUEOUS PAINTS

This invention relates to a resin composition for aqueous coating compositions and more particularly to a resin composition for aqueous coating compositions which is useful as a resin composition for cationic electrodeposition coating compositions and which is excellent in dispersibility in water, bath stability and dispersibility of pigments therein.

As a base resin for cationic electrodeposition coating compositions, there have generally been used amine-added epoxy resins obtained by reaction between a diepoxide having a high molecular weight (number average molecular weight of about 1,000 or more) and a secondary amine (for example, diethanolamine, methylethanoiamine, diethylamine, etc.). These resins can be hardened by crosslinking reaction with a blocked polyisocyanate compound or the like, and therefore their coating films are excellent in corrosion resistance. However, the aforementioned amine-added epoxy resins are made insufficiently water-dispersible by partial neutralization with acids because they contain tertiary amine groups as a cationic group. On the other hand, full neutralization thereof results in lowering of the pH of a resulting electrodeposition coating bath inducing a problem of insufficient corrosion resistance of the composition.

It is widely known that crosslinking agents such as blocked polyisocyanate compounds rapidly react with primary hydroxyl groups of a base resin to crosslink and harden it. Also, it is known that an effective measure to introduce primary hydroxyl groups in a base resin for a cationic electrodeposition coating composition containing a glycidyl ether of bisphenol A type as a basic skeleton is to use a secondary alkanolamine as a secondary amine. However, use of such secondary amines decreases water dispersibility as described above.

Also, it has been tried to use a reaction product between a polyepoxide having three or more epoxy groups per molecule (epoxy equivalent: 100 to 1,000) and a polyphenol (for example, alkylene diphenol) as a base resin for a cationic electrodeposition coating composition. This trial has revealed impractical results since there occurs an increase in the viscosity of the reaction mixture or gelation during the reaction between the polyepoxide and the polyphenol. In addition, amine-added product of the polyepoxide is undesirable because it gives rise to a local increase in the base concentration so that the corrosion resistance of the resulting resin deteriorates.

Further, a base resin for a cationic electrodeposition coating composition is known which is obtained by reacting a specified polyepoxide with a primary or secondary amine containing a primary hydroxyl group. Although this base resin has excellent water dispersibility upon partial neutralization with an acid, the increased polyepoxide concentration intended to increase water dispersibility necessarily leads to a decrease in the concentration of benzene nucleus that controls the corrosion resistance of the resin since the polyepoxide has an alicyclic nucleus.

Therefore, there has been a strong desire to develop a cationic base resin for use in electrodeposition to which primary hydroxyl groups can be incorporated with a secondary alkanolamine and which has excellent water dispersibility during partial neutralization and excellent corrosion resistance after coating.

An object of this invention is to provide a resin composition for an aqueous coating composition which is useful as a base resin for a cationic electrodeposition coating composition, which is free from increase in viscosity and occurrence of gelation during its synthesis reaction, which has excellent water dispersibility even in the cases of partial neutralization, and which has excellent corrosion resistance after coating as well as a cationic electrodeposition coating composition using such a resin composition.

According to one aspect of this invention, there is provided a resin composition for an aqueous coating composition, comprising as a main component a cationic resin (U) having a primary hydroxyl group obtained by reacting:

(A) a phenol-novolak type epoxy resin represented by the following general formula (I)

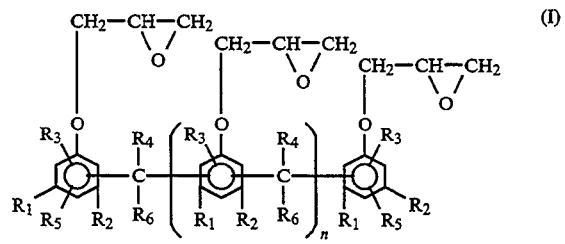

wherein
$R_1$ and $R_2$, which are the same or different, independently represent a hydrogen atom, an alkyl group having 1 to 8 carbon atoms, an aryl group, an aralkyl group or a halogen atom;
$R_3$ represents a hydrogen atom, an alkyl group having 1 to 10 carbon atoms, an aryl group, an aralkyl group, an allyl group or a halogen atom;
$R_4$ and $R_6$, which are the same or different, independently represent a hydrogen atom, an alkyl group having 1 to 4 carbon atoms or a glycidyloxyphenyl group;
$R_5$ represents a hydrogen atom, an alkyl group having 1 to 10 carbon atoms, an aryl group, an aralkyl group, an allyl group or a halogen atom; and
n is an integer of 1 to 38, (B) a primary or secondary amine compound having a primary hydroxyl group; and
(C) a phenol compound having at least one phenolic hydroxyl group per molecule.

According to another aspect of this invention, there is provided a cationic electrodeposition coating composition (V) comprising as a main component a mixture of the aforementioned cationic resin (U) having a primary hydroxyl group, and a hardening agent (H) selected preferably from (H-1) a blocked polyisocyanate compound, (H-2) a polyepoxide compound, and (H-3) a compound having two or more unsaturated groups per molecule.

According to a further aspect of this invention, there is provided:

A resin composition (W) for a self-hardening coating composition obtained by partially reacting the cationic resin (U) having a primary hydroxyl group with the hardening agent (H);

A cationic electrodeposition coating composition (X) comprising as a main component the resin composition (W) for a self-hardening coating composition;

A pigment-dispersed paste (Y) comprising the cationic resin (U) having a primary hydroxyl group or the resin composition (W) for a self-hardening coating composition, and a pigment (G); and Articles coated with the cationic electrodeposition coating composition (V) or the cationic electrodeposition coating composition (X).

Hereinafter, further explanation will be made on the resin composition, cationic electrodeposition coating composition and pigment paste of this invention.

Component (A)

Phenol-novolak type epoxy resin represented by the following general formula (I)

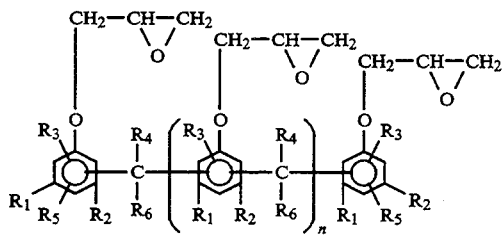

$R_1$ and $R_2$, which are the same or different, independently represent a hydrogen atom, an alkyl group having 1 to 8 carbon atoms, an aryl group, an aralkyl group or a halogen atom;

$R_3$ represents a hydrogen atom, an alkyl group having 1 to 10 carbon atoms, an aryl group, an aralkyl group, an allyl group or a halogen atom;

$R_4$ and $R_6$, which are the same or different, independently represent a hydrogen atom, an alkyl group having 1 to 4 carbon atoms or a glycidyloxyphenyl group; and $R_5$ represents a hydrogen atom, an alkyl group having 1 to 10 carbon atoms, an aryl group, an aralkyl group, an allyl group or a halogen atom; and n is an integer of 1 to 38.

In the above general formula (I), "alkyl group" is straight chain or branched chain, and includes, for example, methyl, ethyl, propyl, isopropyl, butyl, isobutyl, sec-butyl, tert-butyl, pentyl, isoamyl, hexyl, heptyl, octyl, 2-ethylhexyl, nonyl, decyl, etc. groups. "Aryl group" may be either monocyclic or polycyclic, and includes, for example, phenyl, naphthyl, etc. groups. In particular, a phenyl group is preferred. "Aralkyl group" is an aryl-substituted alkyl group of which the aryl and alkyl moieties have the aforementioned meanings, respectively. Examples thereof include, for example, benzyl, phenethyl, etc. groups, with a benzyl group being preferred.

"Halogen atom" includes a fluorine atom, a chlorine atom, a bromine atom and an iodine atom.

"Organic group having a glycidyloxyphenyl group" which can be represented by $R_4$ and/or $R_6$ is an organic group having a group represented by formula

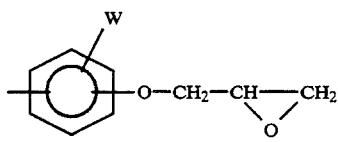

wherein W is a hydrogen atom or an alkyl group having 1 to 10 carbon atoms. Preferred examples of the organic group include, for example, glycidyloxyphenyl, glycidyloxyphenylmethyl, glycidyloxyphenylethyl, glycidyloxyphenylpropyl, glycidyloxyphenylbutyl, glycidyloxyphenylpentyl, glycidyloxyphenylhexyl, glycidyloxyphenyloctyl, glycidyloxyphenylnonyl, etc. groups.

In the general formula (I), $R_1$ and $R_2$ are preferably a hydrogen atom, a methyl group, a chlorine atom, or a bromine atom, with a hydrogen atom, a methyl group and a bromine atom being particularly preferred. $R_3$ and $R_5$ are preferably a methyl group, a tert-butyl group, a nonyl group, a phenyl group, a chlorine atom or a bromine atom, with a methyl group, a tert-butyl group, a phenyl group and a bromine atom being particularly preferred. Further, $R_4$ and $R_6$ are preferably a hydrogen atom, and n is preferably 1 to 25, and more preferably 1 to 8.

It is preferred that the epoxy resin (A) has a number average molecular weight within the range of generally about 400 to 8,000, particularly 500 to 3,000 and more particularly 600 to 2,000, as measured by a vapor pressure-osomotic pressure method. From this number average molecular weight one can calculate a number average repeating unit number (n+2). Also, it is preferred that the epoxy resin (A) has in average generally 3.5 to 10, particularly 3.5 to 8, and more particularly 4 to 7, glycidyl groups per molecule, and that the epoxy resin (A) has an epoxy equivalent within the range of about 180 to about 2,000, particularly 180 to 1,000, and more particularly 180 to 600.

The epoxy resin (A) can be prepared, for example, by reacting epihalohydrin (A-5) with a phenol-novolak type resin (A-4) which is obtained by polycondensation reaction between a bifunctional phenyl compound (A-1) represented by the following general formula (III)

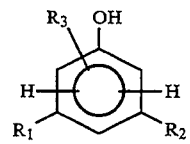

wherein $R_1$, $R_2$ and $R_3$ have the same meanings as defined above, and an aldehyde compound (A-2) represented by the following general formula (IV)

$$R_4-CHO \quad (IV)$$

wherein $R_4$ has the same meaning as defined above, and/or a ketone compound (A-3) represented by the following general formula (V)

$$R_4-CO-R_6 \quad (V)$$

wherein $R_4$ and $R_6$ have the same meanings as defined above, to introduce a glycidyl ether group in the phenolnovolak type resin (A-4).

During or after the reaction for obtaining the aforementioned phenol-novolak resin (A-4), a monofunctional phenol compound (A-6) represented by the following general formula (VI)

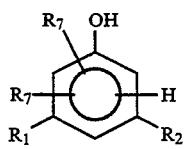
(VI)

wherein

R₇ represents a alkyl group having 1 to 10 carbon atoms, an aryl group, an aralkyl group, an allyl group or a halogen atom; and R₁ and R₂ have the same meanings as defined above, may be used in combination as a terminal blocking agent, as necessary.

Specific examples of the group represented by R₇ in the formula (VI) above include a methyl group, an ethyl group, a propyl group, an n-butyl group, a tertbutyl group, a pentyl group, a hexyl group, a nonyl group, an ethylene group, a propylene group, a phenyl group, a benzyl group, a chlorine atom, a bromine atom, and an iodine atom, with a methyl group, a tert-butyl group, a nonyl group, a phenyl group, a chlorine atom, and a bromine atom being particularly preferred.

The term "bifunctional" as used for the phenol compound as component (A-1) above means that in general formula (III), two hydrogen atoms are bonded to directly to the benzene nucleus at the ortho and/or para-position with respect to the hydroxyl group. The hydrogen atoms will react with carbonyl group (C═O) in the components (A-2) and (A-3) above by condensation reaction with dehydration to form a phenol-novolak resin (A-4).

The term "monofunctional" as used for the phenol compound as component (A-6) means that in the general formula (IV), one hydrogen atom is bonded to the benzene ring at the ortho- or para-position with respect to the hydroxyl group. The hydrogen atom will react with carbonyl group (C═O) in the component (A-2) or (A-3) above by condensation reaction with dehydration to form terminals thereof.

As the bifunctional compound (A-1) represented by the formula (III) above, there can be cited, for example, phenol, p-propenylphenol, o-benzylphenol, 6-n-amyl-n-cresol, o-cresol, p-cresol, o-ethylphenol, o-phenylphenol, p-phenylphenol, P-tert-pentylphenol, p-tert-butylphenol, o-chlorophenol, p-chlorophenol, 4-chloro-3,5-xylenol, o-allylphenol, nonylphenol, o-bromophenol, p-cumylphenol, etc.

As the aldehyde compound (A-2) represented by the formula (IV) above, there can be cited, for example, acetaldehyde, formaldehyde, etc. Also, m- (or p-) hydroxybenzaldehyde may be used as the aldehyde compound (A-2), and after the reaction with the component (A-1), the hydroxybenzaldehyde may be converted to glycidyl ether with the epihalohydrin (A-5). The benzene nucleus of the hydroxybenzaldehyde may be substituted with am alkyl group having 1 to 10 carbon atoms.

As the ketone compound (A-3) represented by the formula (V), there can be cited, for example, acetone, methyl ethyl ketone, methyl isobutyl ketones, etc. Further, use of 2-acetylphenyl-2-hydroxyphenylpropane makes it possible to introduce a glycidyloxyphenyl group in the resin represented by the formula (I) above This makes at least a portion of

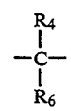

to be

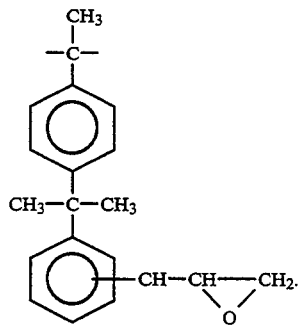

Further, as the epihalohydrin (A-5), there can be cited, for example, epichlorohydrin, epibromohydrin, etc.

The phenol-novolak resin (A-4) can be obtained by polycondensing the (A-1) component above with the (A-2) and/or (A-3) component above. The polycondensation reaction can be performed similarly to an ordinary production method for phenol-novolak resin which is known by itself. More specifically, the reaction may be performed by a batch method, or by the continuous method as described, for example, in Japanese Patent Application Laid-Open NO. 130498/1976. For example, the (A-4) component can be obtained by blending each component in proportions such that the repeating unit number (n) in the formula (I) above is within the range of 1 to 38, and the number average molecular weight and epoxy equivalent are within the aforementioned ranges, followed by reaction. In this reaction, there may be used a catalyst such an inorganic acids, e.g., hydrochloric acid, phosphoric acid, sulfuric acid, etc.; organic acids, e.g., p-toluenesulfonic acid, oxalic acid, etc.; metal salts, e.g., zinc acetate, etc.

In the production of the (A-4) component, the monofunctional phenol compound (A-6) represented by the formula (VI) above may be reacted as a terminal blocking agent during or after polycondensation reaction of the (A-1) component with the (A-2) component and/or (A-3) component as necessary.

Specific examples of the monofunctional phenol compound (A-6) represented by the formula (VI) above include, for example, 2-tert-butyl-4-methylphenol, 2,4-xylenol, 2,6-xyloneol, 2,4-dichlorophenol, 2,4-dibromophenol, dichloroxylenol, dibromoxylenol, 2,4,5-trichlorophenol, 6-phenyl-2-chlorophenol, etc.

The polycondensation of the (A-6) component with the (A-1) component, (A-2) component and/or (A-3) component above can be performed in the same manner as described above. Novolak-phenol resin obtained using the (A-6) component in combination is also included in the category of the (A-4) component.

The (A) component can be obtained by reacting the (A-5) component with phenolic hydroxyl groups in the (A-4) component to convert them into glycidyl ether. More specifically, for example, the (A-4) component is dissolved in the (A-5) component, and an aqueous solution of an alkali metal hydroxide is continuously added to the resulting solution, followed by distilling off water and unreacted (A-5) component in the reaction mixture. From the the distillate can be removed (A-5) component, which can be reused. This reaction can be performed preferably in the presence of an ether type solvent such as dioxane, diethoxyethane, etc.

The component (A) may be one which has been produced as described above or one which is commercially available. As such a commercially available product, there can be cited, for example, DEN-438 and DEN-439 (trade names for products by Dow Chemical Japan Co., Ltd.) as polyglycidyl ether product of phenol-novolak resin; EPICRON N-695 (trade name for a product by DAINIPPON INK AND CHEMICALS INDUSTRY CO., LTD.), ESCN-195XHH (trade name for a product by SUMITOMO CHEMICAL CO., LTD.), EOCN-102S, EOCN-1020 and EOCN-104S (trade names for products by NIPPON KAYAKU CO., LTD.) as polyglycidyl ether products of cresol-novolak resins; BREN-S (trade name for a product by NIPPON KAYAKU CO., LTD.) as polyglycidyl ether product of bromine-modified phenolnovolak resin; ESMB-260 (trade name for a product by SUMITOMO CHEMICAL CO., LTD.) as polyglycidyl ether product of long-chain alkyl-modified phenol-novolak resin; etc.

Component (B)

Primary or secondary amine compound having at least one primary hydroxyl group per molecule This component reacts with the component (A) above and serves to introduce primary hydroxyl group and basic group(s) in the component (A).

Reaction between amino groups in the component (B) and glycidyl groups represented by formula (I) in the component (A) produces cationic resin having primary hydroxyl groups and basic groups. The cationic resin is superior in water dispersibility and throwing power even after partial neutralization or at high pH over the aforementioned conventional cationic resin produced by reaction between the conventional bisphenol A type epoxy resin, and does not deteriorate hardenability and corrosion resistance of a coating film formed.

As the component (B), there can be cited the following compounds.

(1) Monoalkanolamines such as monoethanolamine, monopropanolamine, monobutanolamine, etc.

(2) N-Alkylalkanolamines or N,N-dialkanolamines such as N-methylethanolamine, N-ethylethanolamine, N,N-diethanolamine, N,N-di-n-(or iso-)propanolamine, N,N-dibutanolamine, etc.

(3) Addition product of monoalkanolamine and $\alpha,\beta$-unsaturated carbonyl compound: for example, addition product of monoethanolamine and N,N-dimethylaminopropylacrylamide, addition product of monoethanolamine and hydroxylethyl (meth)acrylate, addition product of monoethanolamine and hydroxypropyl (meth)acrylate, addition product of monoethanolamine and hydroxybutyl (meth)acrylate, etc.

(4) Hydroxyalkylaminoalkylamine such as hydroxyethylaminoethylamine, (5) Condensation product between at least one compound selected from hydroxyethylamine, hydroxyethylhydrazine and hydroxybutylhydrazine and a ketone compound, for example, dimethyl ketone, methyl ethyl ketone, methyl isobutyl ketone, dibutyl ketone, dipropyl ketone, etc.

(6) Amine compound having a primary hydroxyl group, a secondary amino group and an amido group in one molecule simultaneously, represented by the following general formula (VII)

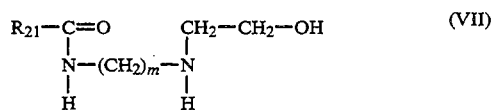

wherein
m is an integer of 1 to 6;
$R_{21}$ is hydrocarbon chain having 4 to 36 carbon atoms which may contain a hydroxyl group and/or a polymerizable unsaturated group.

The amine compound represented by the general formula (VII) can be obtained, for example, by condensation with dehydration between N-hydroxyalkylalkylenediamine and a monocarboxylic acid having 5 to 37 carbon atoms. As the amine, there can be used preferably diamines having a primary hydroxyl group, such as hydroxyetheylaminoethylamine, N-hydroxyethylpropylenediamine, N-hydroxyethylbutylenediamine, N-hydroxyethylpentylenediamine, N-hydroxyethylhexylenediamine, etc. As the monocarboxylic acid, there can be cited, for example, mixed fatty acids such as coconut oil fatty acid, castor oil fatty acid, rice bran oil fatty acid, soy bean fatty acid, tall oil fatty acid, dehydrated castor oil fatty acid, safflower oil fatty acid, linseed oil fatty acid, and tung oil fatty acid; caprylic acid, capric acid, lauric acid, myristic acid, palmitic acid, stearic acid, oleic acid, ricinolic acid, rinolic acid, rinoleic acid, eleostearic acid, 12-hydroxystearic acid, behenic acid, etc.

The reaction between the aforementioned amine and monocarboxylic acid for obtaining the amine compound represented by the formula (VII) above can be performed usually by mixing the both components in equimolar proportions, removing a predetermined amount of reaction product water using an organic solvent such as toluene or methyl isobutyl ketone, and then removing the remaining organic solvent by a vacuum evaporation method or the like to obtain an amine compound. It is preferred that the amine compound thus obtained has an amine (secondary amine) value within the range of generally 88 to 350, particularly 120 to 230, and more particularly 130 to 200, and a hydroxyl value, preferably primary hydroxyl value, (KOH mg/g) within the range of generally 44 to 350, particularly 60 to 230, and more particularly 65 to 200.

Among (1) to (6) as the component (B), the amine compounds (2), (3) and (6) above are preferred. In particular, it is preferred to use the amine compound represented by the formula (VII) (especially hydroxyethylamine fatty acid amide) and diethanolamine in combination in order to improve properties of the coated surface such as smoothness and corrosion resistance. Preferably, the proportion of the amine compound (especially hydroxyethylaminoethyl fatty acid amide) to diethanolamine is 30 to 80% by weight, particularly 40 to 80% by weight, of the former and 70 to 20% by weight, particularly 60 to 20% by weight, of the latter based on total weight of the both components.

Component (C)

Phenol compound having at least one phenolic hydroxyl group per molecule

Phenol compound having a phenolic hydroxyl group as the component (C) is desirably one which has among others at least one, preferably 1 to 4, and more preferably 1 to 2, structural units represented by the following general formula (VIII)

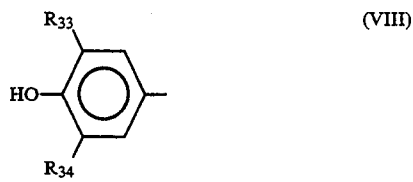

wherein $R_{33}$ and $R_{34}$, which are the same or different, independently represent a hydrogen atom, an alkyl group having 1 to 10 carbon atoms, an aryl group, an aralkyl group, an allyl group or a halogen atom, and the component (C) has a number average molecular weight within the range of usually 94 to 20,000, particularly 150 to 5,000, and more particularly 200 to 3,000.

Specific examples of the component (C) include polyphenol compounds such as bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, 1,1,2,2,-tetrakis(4-hydroxyphenyl)ethane, 4,4'-dihydroxydiphenyl ether, 4,4'-dihyroxydiphenylsulfone, phenol-novolak, and cresol-novolak; monphenol compounds such as phenol, nonylphenol, α- or β-naphthol, p-tert-octylphenol, and o- or p-phenylphenol.

In this invention, the corrosion resistance of a coating film can be further increased by the use of compounds component (C) containing a functional group having a phenolic hydroxyl group, represented by the following general formula (II)

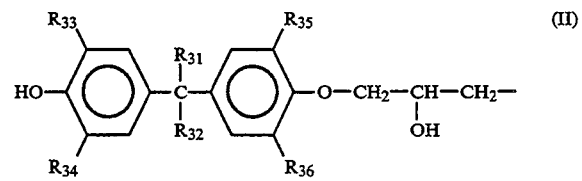

wherein $R_{31}$ and $R_{32}$, which are the same or different, independently represent an alkyl group having 1 to 4 carbon atoms; and $R_{33}$ and $R_{36}$, which are the same or different, independently represent a hydrogen atom, an alkyl group having 1 to 10 carbon atoms, an aryl group, an aralkyl group, an allyl group or a halogen atom.

There is no limitation on the number average molecular weight of the component (C) containing the functional group having a phenolic hydroxyl group represented by the formula (II) above, and is preferably within the range of generally 500 to 20,000, particularly 500 to 5,000, and more particularly 800 to 3,000. It is preferred that the component (C) contains in average 0.3 to 2, particularly 0.5 to 1.5, and more particularly 0.8 to 1.2 functional groups having a phenolic hydroxyl group represented by the formula (II) above per molecule.

In addition, there can be favorably used, as the compound (component (C)) containing the functional group having a phenolic hydroxyl group represented by the formula (II) above, a compound represented by the following general formula (IX)

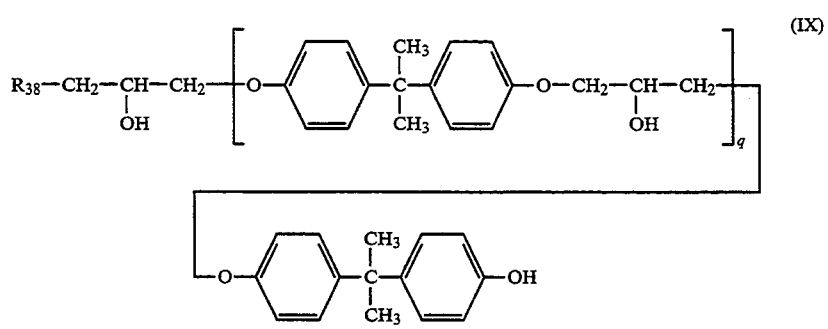

wherein $q$ is 0 or integer of 1 to 7; and $R_{38}$ represents a residual group of an active hydrogen-containing compound.

As the active hydrogen-containing compound which is a precursor of $R_{38}$ in the formula (IX) above, there can be cited, for example, amines such as secondary amines; phenols such as phenylphenol and nonylphenol; organic acids such as fatty acids; thiols; alcohols such as alkyl alcohols, cellosolve, butylcellosolve, and carbitol; inorganic acids; and so on. Among them, particularly preferred are secondary amines having a primary hydroxyl group such as dialkanolamines; amine compounds represented by the formula (VII) above; phenols such as nonylphenol, phenylphenol, phenol, and hydroquinone monomethyl ether; fatty acids such as stearic acids, oleic acid, and soy bean fatty acid; lower organic acids such as acetic acid, formic acid, and hydroxyacetic acid; and so on.

A compound the same as that represented by the formula (IX) except that the both ends thereof are only one of $R_{38}$ and —OH instead of $R_{38}$ and —OH my be present in the component (C) as a mixture. It is preferred that the compound contains the functional group having a phenolic hydroxyl group in an amount of in average 0.5 to 1.5, particularly 0.8 to 1.2 per one molecule, and a number average molecular weight within the range of 500 to 20,000, particularly 800 to 3,000.

The component (C) containing the functional group having a phenolic hydroxyl group can be obtained, for example, by reacting a bisphenol type glycidyl ether, a bisphenol type diphenol and an active hydrogen-containing compound (for example, N-alkylalkanolamine, dialkanolamine, etc.) in the presence of a catalyst and a solvent as necessary at a temperature of 30° to 300° C. preferably 70° to 180° C. In this reaction, there may be present as a mixture, polyols such as dimer diol, ethylene glycol, propylene glycol, and butylene glycol; polyether polyols such as polyethylene glycol, polypropylene glycol, and polybutylene glycol; polyester polyols such polycaprolactone; polycarboxylic acids; polyisocyanates; monoisocyanates; oxides of unsaturated compounds such as ethylene oxide, propylene oxide, butylene oxide, and styrene oxide; glycidyl ethers hydroxyl group-containing compounds such as allyl glycidyl ether, polypropylene glycol diglycidyl ether, 2-ethylhexyl glycidyl ether, methyl glycidyl ether, butyl glycidyl ether, and phenyl glycidyl ether; glycidyl esters or organic acids such as fatty acids; alicyclic oxirane-containing compounds; and so on. Further, d-4-caprolactone, acrylic monomer, etc. may be graft polymerized thereon.

Cationic Resin (U)

The cationic resin (U) having a primary hydroxyl group according to this invention can be obtained by reacting the components (A), (B) and (C) above. This reaction may be performed by reacting the component (A) with the components (B) and (C). For example, the components (A), (B) and (C) are reacted simultaneously; first the component (A) is reacted with the component (B), and then the component (C) is reacted; first the component (A) is reacted with the component (C), and then the component (B) is reacted; and so on, and thus the cationic resin (U) is obtained.

The reaction between the components (A) and (B) is a reaction between the glycidyl group in the component (A) and the primary and/or secondary amino group in the component (B), which reaction produces a secondary and/or tertiary amino group, respectively. Also, the reaction between the components (A) and (C) is a reaction between the glycidyl group in the component (A) and the phenolic hydroxyl group in the component (C), which reaction produces an ether bond. The cationic resin (U) thus obtained contains no or substantially no remaining glycidyl group (it contains substantially no glycidyl group) since as a rule the glycidyl group contained in the component (A) is consumed in the aforementioned reaction.

Proportions of the components are not critical and may be selected freely depending on the purposes. For example, it is preferred that the reaction proceeds such that total mole number of the amino group in the component (B) and the phenolic hydroxyl group in the component (C) is 0.75 to 1.5 moles, particularly 0.8 to 1.2 moles for 1 mole of glycidyl groups in component (A). If the total mole number is less than 0.75 mole, the viscosity of the product could sometimes become high while use of the total mole number above 1.5 moles could result in increased amount of remaining unreacted amino group which gives adverse influence on electrodeposition characteristics. Further, the amount of the component (A) to be used is suitably 0.5 to 75% by weight, particularly 5 to 50% by weight, and more particularly 7 to 20% by weight, based on total weight of the components (A), (B) and (C). If it is less than 0.5% by weight, the resulting resin tends to have insufficient water dispersibility, and on the contrary, if it exceeds 75% by weight, the amine value increases to high enough a level to deteriorate corrosion resistance of the resulting coated film. It is desirable to use the component (B) in amounts such that the hydroxyl equivalent of the resulting cationic resin (U) is within the range of 250 to 2,000, preferably 300 to 1,000, and more preferably 300 to 700, and the amine value is within the range of 15 to 200, preferably 20 to 150, and more preferably 30 to 100. If the hydroxyl equivalent is below 250, the amine value tends to increase to deteriorate the corrosion resistance of the resulting coated film while if it exceeds 2,000, the hardenability of the resin decreases, which causes a fear that the corrosion resistance of the resulting coated film decreases. On the other hand, it is suitable that the component (C) is used in an amount within the range of 0.05 to 1.5 moles, particularly 0.2 to 1.2 moles, and more particularly 0.3 to 1.0 mole, per mole of the component (A). If the amount of the component (C) is less than 0.05 moles, the water dispersibility of the resin tend to decrease, while if it exceeds 1.5 moles smoothness of the coated surface tends to decrease.

Further, it is preferred that the reaction between the components (A), (B) and (C) proceeds at a temperature within the range of usually 50° to 300° C. particularly 70° to 200° C. This reaction can be performed in the presence of an organic solvent such as an alcohol, a ketone or an ether.

It is preferred that the cationic resin (U) obtained has a number average molecular weight within the range of generally 1,000 to 20,000, particularly 1,500 to 10,000, and more particularly 1,500 to 4,000. Also, it is preferred that the cationic resin, as described above, has a hydroxyl equivalent within the range of generally 250 to 2,000, particularly 300 to 1,000, and more particularly 300 to 700, and an amine value within the range of generally 15 to 200, particularly 20 to 150, and more particularly 30 to 100.

Upon the production of the cationic resin (U), other cationizing agents (D) described below may be used together with the component (B) in order to adjust the hydroxyl equivalent and amine value within the aforementioned ranges, respectively. The component (D) may be used at an initial stage or in the midway of the aforementioned reaction, or after the reaction.

As the other cationizing agent (D), there can be cited, for example, primary amines represented by monoalkylamines such as methylamine, ethylamine, and n- or iso-propylamine; secondary amines represented by dialkylamines such as diethylamine, dipropylamine, and dibutylamine; polyamines represented by alkylene polyamines such as ethylenediamine, diethylenetriamine, ethylaminoethylamine, methylaminopropylamine, dimethylaminoethylamine, and dimethylaminopropylamine; and so on. Further, these may be used together with ammonia, hydrazine, N-hydroxyethylimidazoline compound, etc.

As the other cationizing agent (D), there can also be used amine compounds which have a secondary hydroxyl group, a secondary amino group and an amido group simultaneously in one molecule, obtained by replacing the primary hydroxyl group-containing primary and/or secondary diamine by a secondary hydroxyl group-containing primary and/or secondary diamine in the preparation of the amine compound (6) as described on the component (B) above.

Further, tertiary amines such as triethylamine, triethanolamine, N,N-dimethylethanolamine, N-methyldiethanolamine, N,N'-diethylethanolamine, and N-ethyldiethanolamine may be used as the component (D). These may also be used in the form of quaternary salts obtained by protonating with an acid followed by reaction with an epoxy group.

In addition to the amino compounds, there can be used tertiary sulfonium salts obtained by reacting salts of sulfides such as diethyl sulfide, diphenyl sulfide, tetramethylene sulfide and thiodiethanol with boric acid, carbonic acid, organic moncarboxylic acid or the like with an epoxy group.

Further, there can be used, as the cationizing agent, quaternary phosphonium salts obtained by reacting salts of phosphines such as triethylphosphine, phenyldimethylphosphine, diphenylmethylphosphine, and triphenylphosphine with the above acid with an epoxy group.

In this invention, while it is necessary to form to cationic resin (U) using the component (B), use of the aforementioned other cationizing agent (D) is not mandatory.

The cationic resin (U) containing a primary hydroxyl group thus obtained is used preferably as a resin for a cationic electrodeposition coating composition. In particular, the resin (U) is excellent in water dispersibility and hence it can be blended with an organic or inorganic substance having insufficient water dispersibility to improve its water dispersibility. Therefore, the resin (U) is useful as a water dispersibility improving agent for a cationic electrodeposition coating composition.

Cationic Electrodeposition Coating Composition (V)

The electrodeposition coating composition (V) of this invention is an aqueous coating composition containing, as a main component, a mixture of the cationic resin (U) containing a primary hydroxyl group as described above and a hardening agent (H).

As the hardening agent (H), there can be used conventional hardening agents for cationic electrodeposition coating compositions. In particular, those compounds are preferred which are selected, for example, from a blocked polyisocyanate compound (H-1), a polyepoxide compound (H-2), and a compound having two or more unsaturated groups per molecule (H-3) as described below.

(H-1) Blocked Polyisocyanate Compound

The compound is a polyisocyanate compound having two or more isocyanate groups which are blocked with an active hydrogen-containing blocking agent such as a hydroxyl group. When heated to temperature above a predetermined temperature, the blocking agent is released to regenerate free isocyanate groups, which react with the hydroxyl groups of the cationic resin (U) to crosslink and harden it. As the polyisocyanate compound, there can be used aliphatic, aromatic, and arylaliphatic polyisocyanate compounds, and any known blocking agents can be used. More specifically, those compounds may be used which are described, for example, in Japanese Patent Publication No. 6306/1977, and Japanese Patent Application Laid-Open No. 759/1972 which are incorporated herein by reference. To summarize the contents of the aforementioned Japanese Publications, examples of the polyisocyanate compound include organic diisocyanates per se, e.g., aliphatic diisocyanates such as hexamethylene diisocyanate and trimethylhexamethylene diisocyanate; alicyclic diisocyanates such as hydrogenated xylylene diisocyanate and isophorone diisocyanate; aromatic diisocyanates such as tolylene diisocyanate and 4,4'-diphenylmethane diisocyanate, or addition products of the organic diisocyanates with polyhydric alcohols, low molecular weight polyester resins or water, cyclic polymerization products between the organic diisocyanates, or isocyanate biuret products.

Further, the blocking agent is preferably the one which releases upon heated at a temperature of 100° C. or higher in the presence or absence of a catalyst such as an organometallic compound including tin, lead or the like or an amino compound. For example, there can be used phenol blocking agents, lactam blocking agents, active methylene blocking agents, alcohol blocking agents, mercaptan blocking agents, acid amid blocking agents, imide blocking agents, amine blocking agents, imidazole blocking agents, urea blocking agents, carbamate blocking agents, imine blocking agents, oxime blocking agents or sulfite blocking agents. Among them, phenol blocking agents, lactam blocking agents, alcohol blocking agents and oxime blocking agents are used advantageously.

(H-2) Polyepoxide Compound (1) Compound containing a specified epoxy group represented by the following structural formula

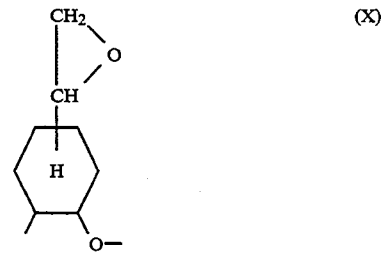

(2) Compound containing a specified epoxy group represented by the following structural formula (XI)

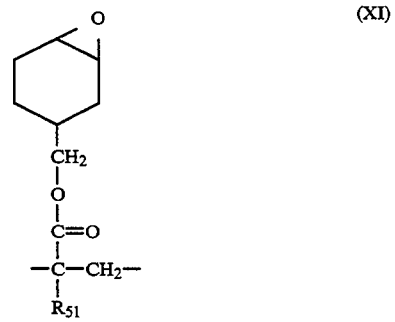

wherein $R_{51}$ represents a hydrogen atom or a methyl group.

The polyepoxide compounds (1) or (2) above are described in detail in EP-A-356970, which is incorporated herein by reference, and detailed description thereon is omitted here.

(3) Phenol type novolak glycidyl ether resin represented by the following general formula (XII)

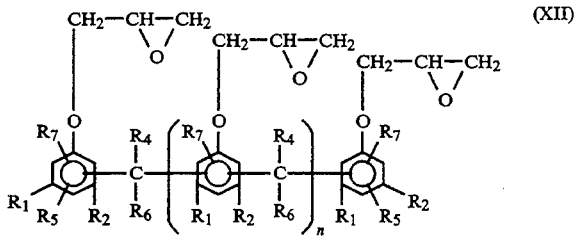
(XII)

In the formula (XII) above, $R_1$ and $R_2$, which are the same or different, independently represent a hydrogen atom, an alkyl group having 1 to 8 carbon atoms, an aryl group, an aralkyl group or a halogen atom; $R_4$ and $R_6$, which are the same or different, independently represent a hydrogen atom, an alkyl group having 1 to 4 carbon atoms; $R_5$ represents a hydrogen atom, an alkyl group having 1 to 10 carbon atoms, an aryl group, an aralkyl group, an allyl group or a halogen atom; $R_7$ represents an alkyl group having 1 to 10 carbon atoms, an aryl group, an aralkyl group, an allyl group or a halogen atoms; and n is 0 or an integer of 1 to 38. In the general formula (XII) above, a part or all of the benzene rings may be substituted by a naphthalene ring. In the case in which $R_7$ is a hydrogen atom, the bath stability of cationic electrodeposition coating composition decreases.

The phenol type novolak glycidyl ether resin represented by the formula (XII) above can be produced in the same manner as the component (A) except that among the components (A-1), (A-2) and (A-3) used for the production of the phenol-novolak type epoxy resin (component (A)) represented by the formula (I) above, $R_3$ in the general formula (III) as the component (A-1) is replaced by $R_7$ (an alkyl group having to 10 carbon atoms, an aryl group, an allyl group or a halogen atom).

(4) Compound having two or more glycidyl groups on a glycidylamino group group bonded directly to a carbon atom in the aromatic ring and represented by the following general formula (XIII)

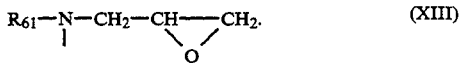
(XIII)

In the formula (XIII) above, $R_{61}$ represents a hydrogen atom or a glycidyl group.

The component (4) above contains an aromatic ring and a glycidyl group in one molecule, and the glycidyl group is introduced by the glycidylamino group represented by the formula (XIII) above, with the nitrogen atom (N) in the formula (XIII) above being bonded directly to one of the carbon atoms in the aromatic ring.

Generally, the component (4) can be obtained by reacting an aniline derivative with epihalohydrin (preferably epichlorohydrin) in the presence of an aqueous solution of an alkali metal hydroxide or the like (catalyst). The aniline derivative is a compound containing a benzene ring or a naphthalene ring to on of whose carbon atoms is directly bonded an amino group (—NH2). There can be cited, for example, monoaniline derivatives having one amino group (—NH2) directly bonded to one of carbon atoms of a benzene ring or a naphthalane ring such as aniline, o-toluidine, m-toluidine, p-toluidine, o-ethylaniline, m-ethylaniline, p-ethylaniline, p-cresidine, 2,4-xylidine, 3,4-xylidine, o-anisidine, p-anisidine and naphthylamine; dianiline derivatives having two amino groups (—NH2) directly bonded to carbon atoms of a benzene ring or a naphthalene ring such as phenylenediamine, 2,4-toluylenediamine, diaminobenzanilide, dianisidine, diaminodiphenyl ether, 3,5-diaminochlorobenzene, 3,3'-dimethylbenzidine, and 1,5-naphthylenediamine; and so on.

Also, as the aniline derivative, there may be used a polycondensate containing a plurality of aromatic rings bonded to each other through a methylene bond or the like, obtained by reacting the monoaniline derivative or dianiline derivative with aldehydes (e.g., formaldehyde, acetaldehyde, etc.) or ketones (e.g., acetone, methyl ethyl ketone, methyl isobutyl ketone, etc.) using as a catalyst an inorganic acid such as hydrochloric acid, phosphoric acid or sulfuric acid; an organic acid such as p-toluenesulfonic acid or oxalic acid; or a metal salt such as zinc acetate. It is preferred that the polycondensate contains aromatic ring repeating units in a number within the range of 2 to 40, particularly 2 to 20. Specific examples of the polycondensate include diaminodiphenylmethane, 3,3'-dimethyl-4,4'-diaminodiphenylmethane, 3,3'-diethyl-4,4'-diaminodiphenylmethane, etc. However, this invention is not limited thereto.

The component (4) may be modified by reacting a portion of glycidyl groups thereon with at least one substance selected from phenols such as bisphenol A, bisphenol F, phenylphenol, nonylphenol, and phenol; higher fatty acids such as dimeric acid, stearic acid; oleic acid, and soy bean oil fatty acid; organic acids such as acetic acid, formic acid, and hydroxyacetic acid; alcohols such as alkyl alcohols, cellosolve, and carbitol; and so on. Among these, phenols and higher fatty acids are particularly preferred. Upon the modification, it is preferred to use a catalyst such as zinc borofluoride or tetramethylammonium chloride.

The component (4) which can be used in this invention preferably has a number average molecular weight within the range of generally about 200 to 8,000, particularly 500 to 5,000, and more particularly 500 to 3,000, as measured by vapor pressure infiltration method, and an epoxy equivalent within the range of generally 100 to 2,000, particularly 100 to 1,000, and more particularly 100 to 600. As such a component (4), there can be used various commercially available product, for example, GAN (trade name for N,N-diglycidylaniline produced by NIPPON KAYAKU CO., LTD.), GOT (trade name for N,N-diglycidyl-o-toluidine produced by NIPPON KAYAKU CO., LTD.), MY720 (trade name for N,N,N',N'-tetraglycidyl-4,4'-diaminodiphenylmethane produced by Ciba-Geigy (Japan) Limited), MY722 (trade name for N,N,N',N'-tetraglycidyl-3,3'-dimethyl-4,4'-diaminodiphenylmethane produced by Ciba-Geigy (Japan) Limited), etc.

(H-3) Compound having two or more carboncarbon unsaturated groups (preferably $\alpha,\beta$-unsaturated groups) in a molecule.

The captioned compound includes (1) and (2) below.

(1) Resin having in average at least two, preferably 2.5 to 10, and more preferably 3 to 7, of 3-alkoxyalkyl-3-(meth)acryloylureido group represented by the following general formula (XIV) per molecule and a number average molecular weight of 800 to 50,000, preferably 1,000 to 10,000, and more preferably 1,000 to 5,000.

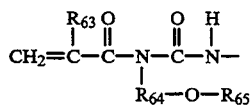

(XIV)

wherein
$R_{63}$ represents a hydrogen atom or a methyl group;
$R_{64}$ represents an alkylene group having 1 to 4 carbon atoms; and
$R_{65}$ represents an alkyl group having 1 to 10 carbon atoms.

Details of the resin (1) above are described in U.S. Pat. No. 5,034,109, which is incorporated herein by reference.

(2) A compound having at least two, preferably 2.5 to 10, of α,β-ethylenically unsaturated groups in a molecule and having no free isocyanate group, obtained by reacting a polyisocyanate compound with an α,β-ethylenically unsaturated monomer having a hydrogen atom reactive with the isocyanate group and a functional group represented by the following general formula (XV); and a compound having at least two, preferably 2.5 to 20, of α,β-ethylenically unsaturated groups in a molecule, obtained by reacting a polyisocyanate compound with an α,β-ethylenically unsaturated monomer having a hydrogen atom reactive with the isocyanate group and a functional group represented by the following general formula (XV) to form a compound having a free isocyanate group, and then reacting this compound with a resin having a primary, secondary amino group and/or a hydroxyl group.

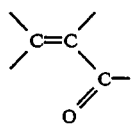

(XV)

Specific explanation of the compounds (2) above is found in U.S. Pat. No. 4,320,220, which is incorporated herein by reference.

Mixing ratios of the cationic resin (U) and the hardening agent (H) in the cationic electrodeposition coating composition (V) are not critical and may be selected freely depending on the purposes. For example, it is preferred that the component (U) is within the range of generally 30 to 90%, particularly 40 to 85%, and more particularly 50 to 80%, and the component (H) is within the range of generally 70 to 10%, particularly 60 to 15%, and more particularly 50 to 20%, based on total weight of the components.

In order to facilitate dispersion or dissolution of the cationic rein (U) in water upon production of the coating composition (V), it is preferred to have a portion or all of the basic groups in the resin (U) neutralized with an acid component such as formic acid, acetic acid, lactic acid, butyric acid or propionic acid.

Resin for Self-Hardening Coating Composition (W)

This resin (W) can be obtained by partially reacting the cationic resin (U) with the hardening agent (H). The cationic electrodeposition coating composition (X) containing as a main component the self-hardening resin (W) can give rise to a crosslinked and hardened coating film when heated as it is without being blended with a hardening agent.

While the kind of the hardening agent (H) used here is not limited particularly, partially blocked polyisocyanate compounds that is readily susceptible to partial reaction are preferred. The resin for self-hardening coating composition (W) can be prepared by reacting the cationic resin (U) with a partially blocked polyisocyanate compound having a free isocyanate group obtained by blocking a polyisocyanate compound having two or more isocyanate groups with a blocking agent until all or substantially all of the free isocyanate groups come to be not left unreacted, in an inert organic solvent at 40° to 200° C. to such an extent that (no substantially no) free isocyanate group remains. The proportion to the partially blocked polyisocyanate compound to the cationic resin (U) may be selected freely taking its hardenability into consideration and depending on the purpose. For example, it is preferred that the proportion in mole of the partially blocked polyisocyanate compound to total of the primary or secondary amino group and hydroxyl group contained in the cationic resin (U) is 0.4 to 1.50, particularly 0.7 to 1.3.

The resin of self-hardening coating composition (W) may be the one in which α,β-unsaturated double bond is introduced in the aforementioned cationic resin (U). The resin (W) of this type can be obtained by reacting a monoisocyanate compound having an α,β-unsaturated double bond and an isocyanate group in one molecule contained in the cationic resin (U) with a primary or secondary amino group and/or a hydroxyl group, the monoisocyanate compound being obtained by reacting all but one isocyanate groups in a polyisocyanate compound having at least two isocyanate groups with a compound having α,β-unsaturated double bond and a functional group containing active hydrogen such as a hydroxyl group or a secondary amido group (for example, hydroxyalkyl (meth)acrylate, methylol (meth)acrylamide, alkoxyalkyl (meth)acrylamide, etc.). In this case, it is preferred that the amount of α,β-unsaturated double bond to be introduced is within the range of generally 200 to 2,000 unsaturation equivalents, particularly 300 to 1,500 unsaturation equivalents, in the solids content of the resin.

Cationic Electrodeposition Coating Composition (X)

The cationic electrodeposition coating composition (X) contains as a main component a protonated product obtained by protonating the resin for self-hardening coating composition (W) with the aforementioned acidic compound, and can be obtained by dissolving or dispersing the resin in water. While it is not mandatory to blend the hardening agent (H) therewith, it may be blended as necessary.

The cationic electrodeposition coating composition (V) and (X) of this invention, which contain as a main component either the cationic resin (U) or the resin self-hardening coating composition (W), may further be blended with one or more of an extender pigment, a corrosion-resistant pigment, a dispersant, a cising-preventing agent, a hardening accelerator, etc., as necessary. Among these additives, the pigments are blended preferably in the form of a pigment dispersed paste (Y) as described below.

Pigment-Dispersed Paste (Y)

The pigment-dispersed paste (Y) can be obtained by dispersing a mixture of at least one member selected from the cationic resin (U) and the resin for self-hardening coating composition (W), and a pigment (coloring pigment, extender pigment, corrosion-resistant pigment, etc.) in water. Further, this may contain one or more of a plasticizer, a wetting agent, a surfactant, a defoaming agent, etc., as necessary.

Mixed dispersion of each component can be performed using a ball mill, a sand mill, a Crowles dissolver, a continuous disperser or the like. It is preferred to divide the pigment to a desired particle size and wet the particles with the aforementioned resin. The particle size of the pigment after dispersion is preferably below 10 μm (about 6 to 8 after Herman grind gauge). It is preferred to perform this dispersion in water. In this case, it is desirable to have a portion or all of the basic groups in the cationic resin (U) and the resin for self-hardening coating composition (W) protonated with the aforementioned acidic compound to for an aqueous dispersion. It is preferred to use the acidic compound in such as amount that the neutralization value of the resin is within the range of generally 5 to 200, particularly 10 to 150, and more particularly 20 to 100, as calculated in terms of KOH (mg/g). While the water content of the aqueous dispersion as the pigment-dispersed paste (Y) is not limited particularly, it is preferably within the range of usually about 20 to 80% by weight, particularly 30 to 70% by weight.

The kind of the pigment used in the pigmentdispersed paste (Y) is not limited particularly. The pigment can be, for example, coloring pigments such as carbon black, titanium white, lead white, lead oxide, and red oxide; extender pigments such as antimony oxide, zinc oxide, basic lead carbonate, basic lead sulfate, barium carbonate, calcium carbonate, aluminum silica, magnesium carbonate, magnesium silica, clay, and talc; corrosionresistant pigments such as strontium chromate, lead chromate, basic lead chromate, red lead oxide, lead silicate, basic lead silicate, lead phosphate, basic led phosphate, lead tripolyphosphate, lead silicochromated yellow lead oxide, lead cyanamide, calcium plumbate, lead suboxide, and lead sulfate. It is preferred that the proportion of the pigment to the resin contained in the pigment paste (Y) for coating composition is within the range of usually 2/1 to 7/1, particularly 3/1 to 6/1, by weight of the solids content.

The cationic electrodeposition coating composition prepared as described above can be cationically electrodeposition coated on a suitable electroconductive substrate (article to be coated), and the resulting film can be heated at a temperature of, for example, 80° to 250° C., preferably 120° to 160° C., for hardening.

In particular, in order to fully harden an electrodeposition coating film of the cationic electrodeposition coating composition of this invention at a low temperature of 160° C. or lower, it is effective to add as a catalyst one or more of metal compounds selected from lead compounds, zirconium compounds, cobalt compounds, aluminum compounds, manganese compounds, copper compounds, zinc compounds, iron compounds, chromium compounds, nickel compounds, tin compounds, etc. Specific example of these metal compounds include chelate compounds such as zirconium acetylacetonate, cobalt acetylacetonate, aluminum acetylacetonate, and manganese acetylacetonate; chelating reaction products between a compound having a β-hydroxylamino structure and lead (II) oxide; carboxylates such as lead 2-ethylhexanoate, lead naphthenate, lead octanoate, lead benzoate, lead acetate, lead lactate, lead formate, lead glycolate, and zirconium octanoate; and so on.

The aforementioned metal compound may be used in such an amount that the ratio of the metal content to the solids content of the cationic resin (U) or the resin for self-hardening coating composition (W) to the solids is generally 10% by weight or less, preferably 0.5 to 5% by weight.

The cationic electrodeposition coating composition obtained according to this invention is excellent in water dispersibility at a low degree of neutralization when the cationic group which endows the cationic resin (U) or the resin for self-hardening coating composition (W) with water dispersibility is a tertiary amino group, and hence the composition of this invention exhibits high pH and high throwing power. Since a large amount of the compound having a primary hydroxyl group can be reacted with the cationic resin (U), a large number of primary hydroxyl groups, which are functional groups useful in various hardening types, can be introduced in the resin, resulting in improvement in hardenability, thus providing the resin composition suitable for cathode electrodeposition coating.

The method for forming an electrodeposition coating film on an electroconductive substrate with the cationic electrodeposition coating composition of this invention is not limited particularly, and the method may be performed under ordinary conditions for cationic electrodeposition coating. For example, a hardening catalyst or the like additive may be blended with the electrodeposition coating composition as necessary to prepare a cationic electrodeposition bath having concentration (solids content concentration) within the range of 5 to 40% by weight, preferably 10 to 25% by weight, and a bath pH within the range of 5 to 8, preferably 5.5 to 7. On this occasion, it is preferred to use the article to be coated as a cathode, and a stainless or carbon plate as an anode. While electrodeposition coating conditions are not limited particularly, generally it is desirable to perform electrodeposition under the conditions of a bath temperature: 20° to 30° C., voltage: 100 to 400 V, preferably 200 to 300 V, current density: 0.01 to 3 A/dm$^2$, current application time: 1 to 5 minutes, electrode area ratio (A/C) 2/1 to 1/2, electrode distance: 10 to 100 cm, and with stirring.

Further, the cationic electrodeposition coating composition of this invention is excellent in water dispersibility, storage stability, bath stability, corrosion resistance, smoothness, etc., since it uses the cationic resin (U) and the resin for self-hardening coating composition (W).

The cationic electrodeposition coating composition provided by this invention has excellent water dispersibility at a low degree of neutralization when the cationic group which endows the cationic resin (U) or the resin for self-hardening coating composition (W) with water dispersibility is a tertiary amino group, and therefore the composition of this invention exhibits high pH and high throwing power. Since a large amount of the compound having a primary hydroxyl group can be reacted with the cationic resin (U), a large number of primary hydroxyl groups, which are functional group useful in various hardening types, can be introduced in the resin, resulting in improvement in hardenability, thus providing a resin composition suitable for cathode electrodeposition coating.

EXAMPLES

Hereinafter, this invention will be described in more detail by examples. Unless otherwise indicated specifically, all "%" and "part" or "parts" used herein are by weight.

I. Preparation Example

(1) Preparation of Amine Compound (B)

(B-1)

A reaction vessel equipped with a thermometer, a stirrer, a reflux condenser, and a water separator was charged with 285 parts of stearic acid, 104 parts of hydroxyethylaminoethylamine, and 80 parts of toluene, which were mixed and stirred with slowly heating to increase the temperature to separate and remove 18 parts of reaction water while removing toluene as necessary. Thereafter, remaining toluene was evaporated off under reduced pressure to obtain an amine compound (B-1) having an amine value of 150 and a solidification point of 76° C.

(B-2): (For Comparison)

A flask equipped with a stirrer, a thermometer, a dropping funnel, and a reflux condenser was charged with 39 parts of monoethanolamine, which was kept at 60° C., and 100 parts of N,N-dimethylaminopropylacrylamide was added thereto dropwise, followed by reaction at 60° C. for 5 hours to obtain an amine compound (B-2).

(2) Preparation of Phenolic Compound (C)

(C-1)

A flask equipped with a stirrer, a thermometer, a dropping funnel, and a reflux condenser was charged with 105 parts of diethanolamine, 760 parts of diglycidyl ether of bisphenol A having an epoxy equivalent of 190, 456 parts of bisphenol A, and 330 parts of ethylene glycol monobutyl ether, and the mixture was allowed to react at 150° C. until the amount of the remaining epoxy group became 0 to obtain a phenolic compound (C-1) having a solids content ratio of 80%.

(C-2)

A flask equipped with a stirrer, a thermometer, a dropping funnel, and a reflux condenser was charged with 170 parts of phenylphenol, 760 parts of diglycidyl ether of bisphenol A having an epoxy equivalent of 190, 456 parts of bisphenol A, 0.2 part of tetramethylammonium chloride, and 346 parts of ethylene glycol monobutyl ether, and the mixture was allowed to react at 150° C. until the amount of the remaining epoxy group became 0 to obtain a phenolic compound (C-2) having a solids content ratio of 80%.

(C-3)

A flask equipped with a stirrer, a thermometer, a dropping funnel, and a reflux condenser was charged with 280 parts of oleic acid, 760 parts of diglycidyl ether of bisphenol A having an epoxy equivalent of 190, 456 parts of bisphenol A, 0.2 part of tetramethylammonium chloride, and 374 parts of ethylene glycol monobutyl ether, and allowed to react at 150° C. until the amount of the remaining epoxy group became 0 to obtain a phenolic compound (C-3) having a solids content ratio of 80%.

(C-4)

A flask equipped with a stirrer, a thermometer, a dropping funnel, and a reflux condenser was charged with 370 parts of amine compound (B-1) above, 760 parts of diglycidyl ether of bisphenol A having an epoxy equivalent of 190, 456 parts of bisphenol A, and 397 parts of ethylene glycol monobutyl ether, and allowed to react at 150° C. until the amount of the remaining epoxy group became 0 to obtain a phenolic compound (C-4) having a solids content ratio of 80%. The value of q in the general formula (IX) above was about 3.

(3) Preparation of Hardening Agent (H)

(H-1)

The 174 parts of tolylene diisocyanate was added dropwise 268.5 parts of ethylene glycol monoethyl ether at 50° C. over 2 hours, and the mixture was kept at 80° C. over 3 hours to obtain a hardening agent (H-1) having a solids content ratio of 80%.

(H-2)

A reaction vessel equipped with a thermometer, a stirrer, a reflux condenser, a dropping funnel was charged with 222 parts of isophorone diisocyanate, 83.4 parts of methyl isobutyl ketone, 0.1 part of dibutyl in dilaurate, and 1 part of hydroquinone monomethyl ether, to which was added dropwise 116 parts of hydroxyethyl acetate at 100° C., and the mixture was allowed to react until NCO value of 112 was reached to obtain a hardening agent (H-2).

(H-3)

A flask equipped with a stirrer, a thermometer, and a reflux condenser was charged with 1917 parts of EPICRON N-695 (DAINIPPON INK AND CHEMICALS INCORPORATED, epoxy equivalent: 213, n=7), 590 parts of ethylene glycol monobutyl ether, 440 parts of nonylphenol, and 0.2 part of tetramethylammonium chloride, and the mixture was allowed to react 150° C. until epoxy equivalent of 350 was reached to obtain a hardening agent (H-3).

(H-4)

A flask equipped with a stirrer, a thermometer, and a reflux condenser was charged with 1917 parts of EPICRON N-695 (DAINIPPON INK AND CHEMICALS INCORPORATED, epoxy equivalent: 213, n=7), 620 parts of ethylene glycol monobutyl ether, 560 parts of tall oil fatty acid, and 0.2 part of tetramethylammonium chloride, and the mixture was allowed to react 150° C. until epoxy equivalent of 370 was reached to obtain a hardening agent (H-4).

(H-5)

A mixture of 100 parts of EHPE-3150 (epoxy equivalent: 180, produced by DAICEL CHEMICAL INDUSTRIES, LTD.), and 25 parts of ethylene glycol monobutyl ether was heated at 100° C. for dissolution to obtained a a hardening agent (H-5) having solids content ratio of and an epoxy equivalent of 180.

(H-6)

A flask equipped with a stirrer, a thermometer, and a reflux condenser was charged with 100 parts of ESMB-260 (SUMITOMO CHEMICAL CO., LTD., epoxy equivalent: 260), and 25 parts of ethylene glycol monobutyl ether, and the mixture was heated for dissolution to obtain a hardening agent (H-6).

(H-7)

A flask equipped with a stirrer, a thermometer, and a reflux condenser was charged with 100 parts of MY720 (CIBA GEIGY (JAPAN) LIMITED, N,N,N',N'-tetraglycidyl-4,4'-diaminodiphenylmethane), and 25 parts of ethylene glycol monobutyl ether, and the mixture was heated for dissolution to obtain a hardening agent (H-7) having a nonvolatile content of 80% and an epoxy equivalent of 115.

(H-8)

A flask equipped with a stirrer, a thermometer, a dropping funnel, and a reflux condenser was charged with 666 parts of isophorone diisocyanate, 11.4 parts of p-benzoquinone, and 11.4 parts of dibutyltin dilaurate. After the temperature was elevated to 120° C., 471 parts of N-n-butoxymethylacrylamide was added dropwise thereto while keeping that temperature, and the reaction was continued until NCO value of 110 was reached when 134 parts of trimethylolpropane was added. The mixture was allowed to react 120° C. until NCO value became 0 when 295 parts of ethylene glycol monobutyl ether was added to obtain a hardening agent (H-8).

remaining epoxy group reached 0, the reaction was terminated to obtained a cationic resin (U).

Then, in the presence of the cationic resin (U), other components shown in Table 1 were mixed and allowed to react 150° C. for 5 hours. Confirming that the amount of the remaining epoxy group reached 0, the reaction was terminated to obtained a composition containing the cationic resin (U).

TABLE 1

|  |  | Example 2 | Example 3 | Example 4 | Example 5 | Example 6 |
|---|---|---|---|---|---|---|
| Cationic Resin (U) |  | U-2 | U-3 | U-4 | U-5 | U-6 |
| Component (A) | BREN-S | 1710 |  |  |  |  |
|  | DEN-438 |  | 1080 |  | 1080 | 1080 |
|  | EOCN-102S |  |  | 1290 |  |  |
| Component (B) | (B-1) | 742 | 742 | 371 | 371 |  |
|  | Diethanolamine | 315 | 210 | 420 | 378 | 483 |
|  | N-Methylethanolamine |  | 45 |  |  |  |
| Component (C) | (C-1) | 1651 |  |  |  | 1651 |
|  | (C-2) |  | 1733 |  |  |  |
|  | (C-3) |  |  | 1870 |  |  |
|  | (C-4) |  |  |  | 1984 |  |
| Solvent | Ethylene glycol monobutyl ether | 692 | 501 | 520 | 439 | 373 |
| Other component |  |  |  |  |  |  |
| Ethylene glycol monobutyl ether |  | 1433 | 1433 | 1433 | 1433 | 1623 |
| Bisphenol A diglycidyl ether |  | 3610 | 3610 | 3610 | 3610 | 2850 |
| Bisphenol A |  | 1596 | 1596 | 1596 | 1596 | 1596 |
| Diethanolamine |  | 525 | 525 | 525 | 525 | 525 |
| Polypropylene glycol diglycidyl ether |  |  |  |  |  | 1520 |
| Solids content ratio (%) |  | 80 | 80 | 80 | 80 | 80 |
| Amine value |  | 57 | 55 | 60 | 66 | 64 |
| Primary hydroxyl group equivalent |  | 491 | 550 | 490 | 473 | 439 |
| Component (A) content ratio (%) |  | 17.4 | 11.1 | 13.9 | 11.1 | 10.8 |

Note:
BERN-S: Bromine-modified novolak-phenol polyglycidyl ether having an epoxy equivalent 285 (NIPPON KAYAKU CO., LTD.)
DEN-438: Novolak-phenol polyglycidyl ether having an epoxy equivalent 180 (DOW CHEMICAL JAPAN CO., LTD.)
ECON-102S: Cresol-novolak phenol polyglycidyl ether having an epoxy equivalent of 215 (NIPPON KAYAKU CO., LTD.)
Polypropylene glycol diglycidyl ether: Epoxy equivalent; 380

II. Examples

Example 1

Cationic Resin (U-1)

A flask equipped with a stirrer, a thermometer, a dropping funnel, and a reflux condenser was charged with 1008 parts of DEN-438 (epoxy equivalent: 180, produced by DOW CHEMICAL JAPAN CO., LTD., component A), 506 parts of ethylene glycol monobutyl ether. After dissolution, 373 parts of diethanolamine (component B), 1651 parts of phenolic compound (C-1), and 742 parts of an amino compound (B-1) were further charged, and slowly heated while mixing with stirring. The mixture was allowed to react 150° C. Confirming that the amount of the remaining epoxy group reached 0, a cationic resin (U-1) was obtained. This had a solid content ratio of 80%, an amine value of 94, a primary hydroxyl group equivalent of 363, and component (A) content ratio of 30.1%.

Examples 2 to 6

Resin Composition Containing Cationic Resin (U-2)

A flask equipped with a stirrer, a dropping funnel, and a reflux condenser was charged components (A), (B) and (C), and a solvent as shown in Table 1, and the mixture was allowed to react 150° C. slowly while mixing with stirring. Confirming that the amount of the

Example 7

A flask equipped with a stirrer, a thermometer, a dropping funnel, and a reflux condenser was charged with 1,008 parts of DEN-438 (epoxy equivalent: 180, produced by DOW CHEMICAL JAPAN CO., LTD.), and 1,045 parts of ethylene glycol monobutyl ether. After heating for dissolution, 378 parts of diethanolamine, 742 parts of the amino compound (B-1), and 2,052 parts of bisphenol A were further charged, and slowly heated while mixing with stirring. The mixture was allowed to react 150° C., and it was confirmed that the amount of the remaining epoxy group reached 0.

Thereafter, 630 parts of diethanolamine, 4,370 parts of diglycidyl ether of bisphenol A having an epoxy equivalent 190, and 1,250 parts of ethylene glycol monobutyl ether were added, and the mixture was allowed to react 150° C. for 5 hours. It was confirmed that the amount of the remaining epoxy group reached 0 to obtain a cationic resin (U-7) having a solids content of 80%, an amine value of 61, a primary hydroxyl group equivalent of 510, and a component (A) content ratio of 11%.

Example 8

Resin for Self-Hardening Coating Composition (W-1)

A flask equipped with a stirrer, a thermometer, a dropping funnel, and a reflux condenser was charged with 1,008 parts of DEN-438 (epoxy equivalent: 180, produced by DOW CHEMICAL JAPAN CO., LTD.), and 931 parts of methyl isobutyl ketone. After heating for dissolution, 378 parts of diethanolamine, 742 parts of the amino compound (B-1), and 1,596 parts of bisphenol A were further charged, and slowly heated while mixing with stirring. The mixture was allowed to react 150° C., and it was confirmed that the amount of the remaining epoxy group reached 0.

Thereafter, 630 parts of diethanolamine, 3,610 parts of diglycidyl ether of bisphenol A having am epoxy equivalent 190, and 1,060 parts of methyl isobutyl ketone were added, and the mixture was allowed to react 150° C. until the amount of the remaining epoxy group reached 0, followed by cooling down to 80° C.

Next, 3,803 parts of the hardening agent (H-2) was added, the mixture was allowed to react at 80° C. until the NCO value reached 0. Then, 2,752 parts of ethylene glycol monobutyl ether was added, followed by heating in order to evaporate off 2,752 parts of methyl isobutyl ketone under reduced pressure to obtain a resin for self-hardening coating composition (W-1) having a solids content of 80%, an amine value of 51, a primary hydroxyl group equivalent of 1,223, a component (A) content of 9%, an $\alpha,\beta$-unsaturated double bond equivalent of 1,223.

Comparative Example 1

A flask equipped with a stirrer, a thermometer, a dropping funnel, and a reflux condenser was charged with 21 parts of diethanolamine, 950 parts of diglycidyl ether of bisphenol A having an epoxy equivalent 190, and 340 parts of polypropylene glycol diglycidyl ether having an epoxy equivalent 340, and 456 parts of bisphenol A, and the mixture was slowly heated while mixing with stirring. The mixture was gently heated with stirring to be reacted at 120° C. and, after confirming that the amount of the remaining epoxy equivalent reached 980, 492 parts of ethylene glycol monobutyl ether was added, and 158 parts of diethanolamine and 43 parts of the amino compound (B-2) were added with keeping the temperature at 100° C. The mixture was allowed to react until increase in viscosity stopped to obtain a comparative resin ((1)) having a solids content of 80%, an amine value of hand a primary hydroxyl group equivalent of 532, which contained no component (A).

mixing with stirring. The mixture was allowed to react 150° C. until it was confirmed that the amount of the remaining epoxy group reached 0.

Thereafter, 630 parts of diethanolamine, 1,520 parts of polypropylene glycol diglycidyl ether having an epoxy equivalent 380, 3,040 parts of diglycidyl ether of biphenol A having an epoxy equivalent of 190, 1,596 parts of bisphenol A, and 1,696.5 parts of ethylene glycol monobutyl ether were added, and the mixture was allowed to react 150° C. for 5 hours when it was confirmed that the amount of the remaining epoxy group reached 0 to obtain a cationic resin ((2)) having a solids content of 80%, an amine value of 78, a primary hydroxyl group equivalent of 361, and a component (A) content of 12%. (No component (c) was used.)

Example 9

Pigment-Dispersed Paste (Y-1)

After kneading a mixture of 10 parts o the cationic resin (U-1), 20 parts of titanium white (TAIPEK CR93, produced by ISHIHARA SANGYO KAISHA LTD.), 2 parts of carbon (MA-7, produced by MITSUBISHI CHEMICAL INDUSTRIES LIMITED) 4 parts of aluminum tripolyphosphate (K WHITE 84, produced by TIEKOKU KAKOU CO., LTD.), 24 parts of clay (GEIKIELITE, GEIKIELITE CHEMICAL CO., LTD.), 0.4 part of acetic acid, and 39.6 parts of deionzied water, the mixture was dispersed with 200 parts of glass bead in a paint shaker to obtain a pigment-dispersed paste (Y-1) having a grit of 10 $\mu$m or less by a particle gauge, and having a solids content of 58%.

Examples 10 to 18 and Comparative Examples 1 and 2

A hardening agent and neutralizing agent were added to the cationic resin described above in the formulation shown in Table 2 below. Deionized water was added to the mixture while stirring well to obtain a emulsion having a solids content of 30%.

A catalyst shown in Table 2 and the pigmentdispersed paste (Y-1) were mixed in advance, and the resulting mixture was mixed with 333 pars of the aforementioned emulsion. Adding deionized water thereto to obtain an electrodeposition coating composition having a solid content of 20%.

TABLE 2

| | Cationic resin | | Hardening Agent | | Neutralizing Agent | Deionized Water | Catalyst | |
|---|---|---|---|---|---|---|---|---|
| | | | | | | | Kind | Amount |
| Example | | | | | | | | |
| 10 | U-1 | 62.5 | H-4 | 62.5 | Formic acid | 1.2 | 207.1 | Lead octenate | 2.6 |
| 11 | U-2 | 93.7 | H-3 | 31.3 | Acetic acid | 1.6 | 204.1 | Lead octenate | 2.6 |
| 12 | U-3 | 75.0 | H-3 | 50.0 | Acetic acid | 1.6 | 204.1 | Lead octenate | 2.6 |
| 13 | U-4 | 69.0 | H-8 | 56.0 | Formic acid | 1.2 | 207.1 | Lead octenate | 2.6 |
| 14 | U-5 | 93.7 | H-5 | 31.3 | Acetic acid | 1.6 | 204.1 | Lead octenate | 2.6 |
| 15 | U-6 | 81.0 | H-6 | 44.0 | Formic acid | 1.2 | 207.1 | Zinc octenate | 2.6 |
| 16 | U-6 | 100 | H-7 | 25.0 | Formic acid | 1.2 | 207.1 | Zinc octenate | 2.6 |
| 17 | U-7 | 75.0 | H-4 | 50.0 | Acetic acid | 1.6 | 204.1 | Zinc octenate | 2.6 |
| 18 | W-1 | 125 | — | | Formic acid | 1.2 | 207.1 | Zinc octenate | 2.6 |
| C. Ex. | | | | | | | | |
| 1 | (1) | 93.7 | H-5 | 31.3 | Formic acid | 1.2 | 207.1 | Zinc octenate | 2.6 |
| 2 | (2) | 93.7 | H-5 | 31.3 | Formic acid | 1.2 | 207.1 | Zinc octenate | 2.6 |

C. Ex.: Comparative Example

Comparative Example 2

A flask equipped with a stirrer, a thermometer, a dropping funnel, and a reflux condenser was charged with 1,008 parts DEN-438 (epoxy equivalent: 180, produced by DOW CHEMICAL JAPAN CO., LTD., component A), and 399 parts of ethylene glycol monobutyl ether. After dissolution, 588 parts of diethanolamine was further charged, and slowly heated while Using the electrodeposition coating baths obtained in Examples 10 to 18 and Comparative Examples 1 and 2, zinc phosphate-treated steel plates and nonprocessed steel plates were electrodeposited at a bath temperature of 25° C. and at a voltage of 100 to 250 V for 3 minutes, and then baked at 150° C. for 30 minutes to obtain coated plates. Among the plates, those having a hardened coating film thickness of 20 μm were selected, and subjected to coating film performance tests. Results obtained are shown in Table 3.

TABLE 3

|  | Particle Size | | | Smoothness | |
| --- | --- | --- | --- | --- | --- |
|  | Initial | After Storage | PH | of Coated surface | SST Processed |
| Example | | | | | |
| 10 | 0.10 | 0.10 | 6.2 | 0 | Acceptable |
| 11 | 0.18 | 0.20 | 6.4 | 0 | Acceptable |
| 12 | 0.25 | 0.23 | 6.4 | 0 | Acceptable |
| 13 | 0.20 | 0.20 | 6.0 | 0 | Acceptable |
| 14 | 0.18 | 0.20 | 6.3 | 0 | Acceptable |
| 15 | 0.20 | 0.18 | 6.0 | 0 | Acceptable |
| 16 | 0.18 | 0.20 | 6.0 | 0 | Acceptable |
| 17 | 0.15 | 0.16 | 6.5 | 0 | Acceptable |
| 18 | 0.10 | 0.10 | 6.0 | 0 | Acceptable |
| C. Ex. | | | | | |
| 1 | 0.25 | 0.6> | 6.1 | Δ | Unacceptable |
| 2 | 0.6> | precipitated | 6.0 | 0 | Unacceptable |

C. Ex.: Comparative Example

Test Methods

Stability

An emulsion having a solids content of 30% was stored at 30° C. for 15 days, and change in particle diameter of the emulsion after the storage was measured using NANOSIZER N-4, produced by COULTER ELECTRON INS. With a particle size of below 0.3 μm, water dispersibility is judged to be excellent.

pH: Measurement was made by the method described in JIS Z-8802-78 using the automatic pH meter described in JIS K-0802-83.

Smoothness of coated surface

The coated surface coated and baked for hardening under the conditions described above were evaluated by visual observation.

SST Salt spray resistance

Test coating compositions were coated on the plates at a voltage enough to obtain a coating film thickness of 20 μm under the coating conditions described above, and the coated plates were baked at 160° C. for 20 minutes. The plates thus treated were tested according to the technique described in JIS Z-2871. When welling of the coating film in a region of a creek formed at a distance of 2.0 mm from a cut on the coating film on both sides thereof and in other regions was at most 8F according to the grating of ASTM, of plates were judged to be acceptable. Test period was 1,000 hours.

We claim:

1. A resin composition for an aqueous coating composition, comprising as a main component a cationizable resin (U) having a primary hydroxyl group obtained by reacting:

(A) a phenol-novolak type epoxy resin represented by the following general formula (I)

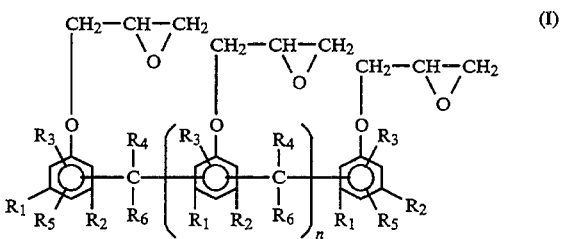

wherein $R_1$ and $R_2$, which are the same or different, independently represent a hydrogen atom, an alkyl group having 1 to 8 carbon atoms, an aryl group, an aralkyl group or a halogen atom; $R_3$ represents a hydrogen atom, an alkyl group having 1 to 10 carbon atoms, an aryl group, an aralkyl group, an allyl group or a halogen atom;

$R_4$ and $R_6$, which are the same or different, independently represent a hydrogen atom, an alkyl group having 1 to 4 carbon atoms or a glycidyloxyphenyl group;

$R_5$ represents a hydrogen atom, an alkyl group having 1 to 10 carbon atoms, an aryl group, an aralkyl group, an allyl group or a halogen atom; and n is an integer of 1 to 38, (B) a secondary amine compound having primary hydroxyl group(s) selected from the group consisting of N-alkylalkanolamines, dialkanolamines, addition products of a monoalkanolamine with an α,β-unsaturated carbonyl compound, and amine compounds represented by the formula (VII) below

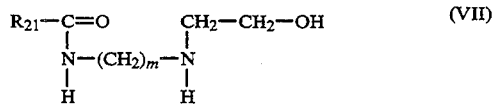

wherein m is an integer of 1 to 6;

$R_{21}$ is hydrocarbon chain having 4 to 36 carbon atoms which may contain a hydroxyl group and/or a polymerizable unsaturated group; and (C) a phenol compound having at least one phenolic hydroxyl group per molecule, said phenol compound being present in an amount within the range of 0.05 to 1.5 moles per mole of said epoxy resin (A).

2. The composition as claimed in claim 1, wherein said epoxy resin (A) has a number average molecular weight within the range of about 400 to about 8,000 as measured by a vapor pressure-osmotic pressure method.

3. The composition as claimed in claim 1, wherein said epoxy resin (A) has an average 3.5 to 10 glycidyl groups per molecule.

4. The composition as claimed in claim 1, wherein said epoxy resin (A) has an epoxy equivalent within the range of 180 to 2,000.

5. The composition as claimed in claim 1, wherein $R_1$ and $R_2$ independently represent a hydrogen atom, a methyl group, a chlorine atom or a bromine atom; $R_3$ and $R_5$ independently represent a methyl group, a tert-butyl group, a nonyl group, a phenyl group, a chlorine atom, or a bromine atom; $R_4$ and $R_6$ independently represent a hydrogen atom; and n an integer of 3 to 25.

6. The composition as claimed in claim 1, wherein said amine compound (B) is a mixture of an amine compound represented by the formula (VII) and diethanolamine.

7. The composition as claimed in claim 1, wherein said phenol compound (C) contains at least 1, preferably 1 to 4, per molecule of structural units represented by formula (VIII) below:

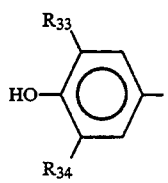

wherein $R_{33}$ and $R_{34}$, which are the same or different, independently represent a hydrogen atom, an alkyl group having 1 to 10 carbon atoms, an aryl group, an aralkyl group, an allyl group or a halogen atom.

8. The composition as claimed in claim 1, wherein said phenol compound (C) is selected from the group consisting of bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphanyl)-2,2-propane, bis(2-hydroxynaphthyl)methane, 1,5-dihydroxynaphthalene, bis(2,4-dihydroxyphenyl)methane, 1,1,2,2,-tetrakis(4-hydroxyphenyl)ethane, 4,4'-dihydroxydiphenyl ether, 4,4'-dihydroxydiphenylsulfone, phenolnovolak, and cresolnovolak; monophenol compounds such as phenol, nonylphenol, α- or β-naphthol, p-tert-octylphenol, and o- or p-phenylphenol.

9. The composition as claimed in claim 1, wherein said phenol compound (C) has an average 0.3 to 3 phenolic hydroxyl group-containing function groups per molecule said functional group being represented by formula below

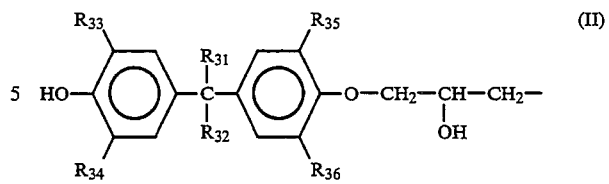

wherein
$R_{31}$ and $R_{32}$, which are the same or different, independently represent an alkyl group having 1 to 4 carbon atoms; and
$R_{33}$ and $R_{36}$, which are the same or different, independently represent a hydrogen atom, an alkyl group having 1 to 10 carbon atoms, an aryl group, an aralkyl group, an allyl group or a halogen atom.

10. The composition as claimed in claim 9, wherein said phenol compound (C) has a number average molecular weight within the range of 500 to 2,000.

11. The composition as claimed in claim 9, wherein said phenol compound (C) is bis(4-hydroxyphenyl)-2,2-propane or bis(4-hydroxyphenyl)methane.

12. The composition as claimed in claim 1, where in said phenol compound is a compound represented by formula (IX) below

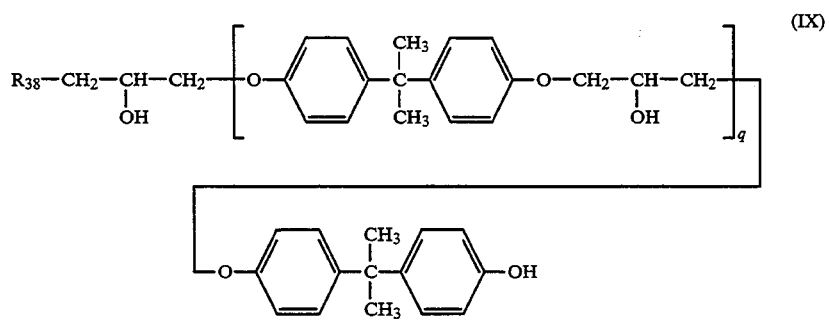

wherein
q is 0 or integer of 1 to 7; and
$R_{38}$ represents a residual group of an active hydrogen-containing compound.

13. The composition as claimed in claim 1, wherein said epoxy resin (A) is present in an amount of 0.5 to 75% by weight based on total weight of said components (A), (B) and (C).

14. The composition as claimed in claim 1, wherein said amine compound (B) is present in a proportion such that a hydroxyl group equivalent of said cationizable resin (U) is within the range of 250 to 2,000.

15. The composition as claimed in claim 1, wherein said cationizable resin (U) has a number average molecular weight within the range of 1,000 to 200,000.

16. The composition as claimed in claim 1, wherein said cationizable resin (U) has a hydroxyl group equivalent within the range of 250 to 2,000, and an amine value within the range of 15 to 200.

* * * * *